United States Patent [19]

Craig

[11] 4,117,548

[45] Sep. 26, 1978

[54] SCREW VENT

[75] Inventor: Gregory C. Craig, Piqua, Ohio

[73] Assignee: The French Oil Mill Machinery Company, Piqua, Ohio

[21] Appl. No.: 856,103

[22] Filed: Nov. 30, 1977

[51] Int. Cl.² ............................................... B29B 1/10
[52] U.S. Cl. ...................................... 366/83; 425/203
[58] Field of Search .................................... 366/75–83, 366/89, 90, 168; 159/2 E, 3; 34/9; 425/203, 207, 208

[56] References Cited

U.S. PATENT DOCUMENTS

| | | | |
|---|---|---|---|
| 3,684,252 | 8/1972 | Nissle et al. | 366/168 |
| 3,737,150 | 6/1973 | Otake | 366/75 |
| 3,781,132 | 12/1973 | Latinen | 366/75 X |
| 3,799,234 | 3/1974 | Skidmore | 159/2 E |
| 3,963,558 | 6/1976 | Skidmore | 159/2 E |
| 4,029,300 | 6/1977 | Morishima | 366/75 |
| 4,060,226 | 11/1977 | Schweller | 366/75 |

Primary Examiner—Leonard D. Christian

Attorney, Agent, or Firm—Biebel, French & Nauman

[57] ABSTRACT

A vent for a devolatilizer includes a means defining a vent opening in the cage of the devolatilizer and a vent duct which communicates with the vent opening. Gas escapes into a cylindrical vent chamber in the vent duct. The chamber is cleaned by a vent screw which is rotated in the chamber and which includes a screw body of minimal diameter and a helical screw flight portion of a pitch which is sufficiently large such that the velocity of the vapor leaving the cage through the vent duct is maintained below a predetermined maximum vapor velocity. This maximum vapor velocity is set such that the amount of fine material which is entrained in the escaping vapor is minimized. A vapor return duct is connected to the vent chamber for extracting vapor from the chamber so that it may be recycled or disposed of. In one embodiment, the pitch of the vent screw flights is reduced in the upper portion of the vent chamber to accelerate the vapor and keep entrained in the gas any fines which may have escaped from the devolatilizer.

6 Claims, 3 Drawing Figures

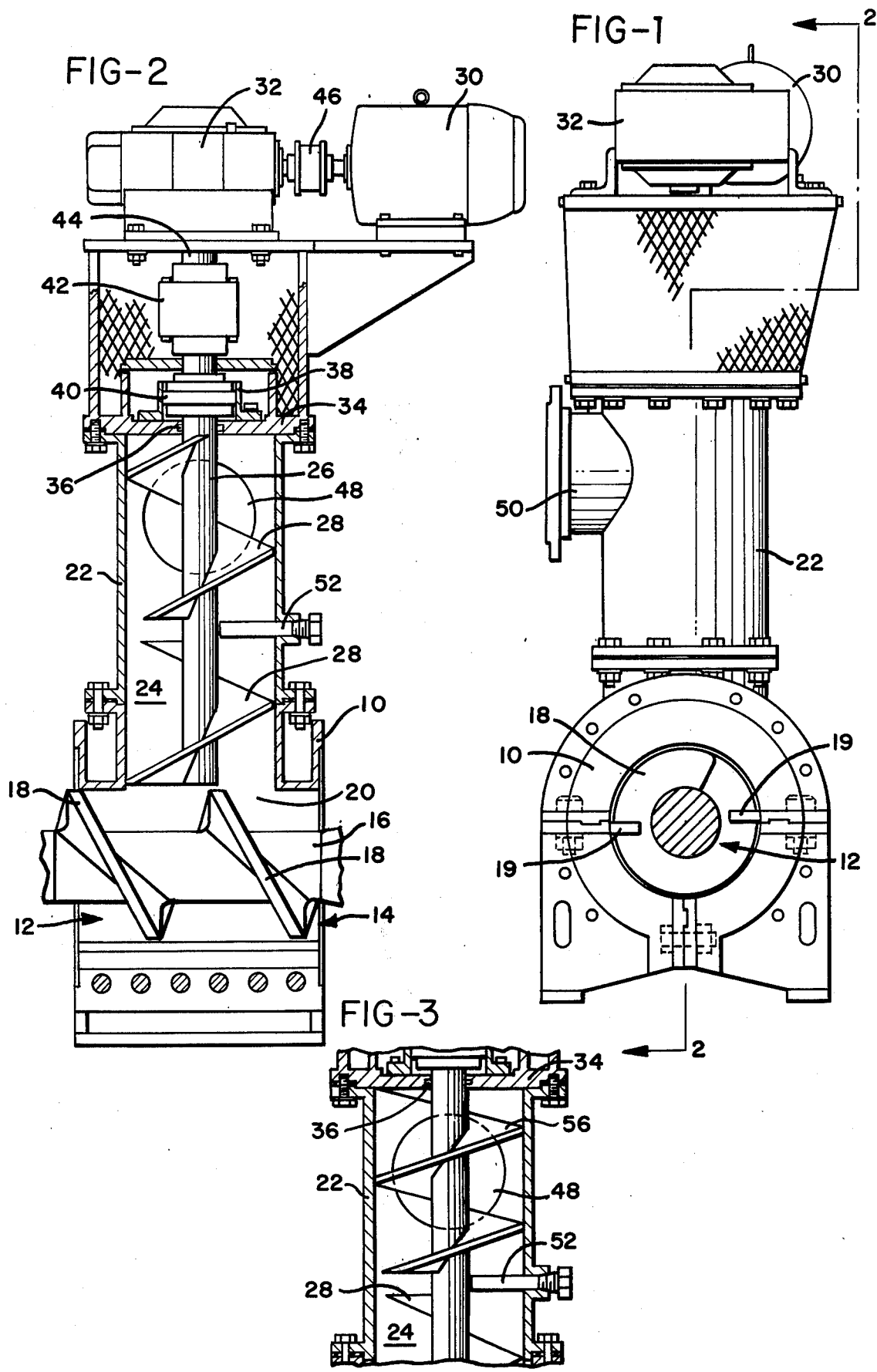

SCREW VENT

BACKGROUND OF THE INVENTION

The present invention relates to apparatus for removing volatile substances or the like from viscous material, such as a polymer substance, by a process termed devolatilization. The polymer material which is to be devolatilized is fed into a cylindrical cage and carried through the cage by screw members. The polymer material is moved through a vented section of the cage, where the pressure on the polymer is substantially reduced, permitting the volatile substance to vaporize and escape. The devolatilized polymer is then carried into an enclosed screw section for further working or for extrusion sizing.

One such devolatilizing device is shown in U.S. Pat. No. 3,684,252, issued Aug. 15, 1972, to Nissle et al and assigned to the assignee of the present invention. Nissle et al discloses a devolatilizing apparatus in which the vent section includes a number of slit-like vent openings around the periphery of the devolatilizer cage. The vented vapors from the devolatilizer cage pass through the vent openings and the volatile substance may thereafter be recovered. Such vent openings may, however, become clogged during extended use. As the volatile substance evaporates in a vent section, small pieces of polymer, termed "fines," may be carried by the vapor and deposited in the vent or in other portions of the vapor recovery system.

The problem of keeping a vent in such a device free of polymer material has been recognized in the past. Several vent arrangements have incorporated static structures designed to prevent clogging. U.S. Pat. No. 3,350,742, issued Nov. 7, 1967, to Wood, shows a vent including a vent liner which is to be replaced periodically. U.S. Pat. No. 3,737,150, issued June 5, 1973, to Otake, discloses a vent arrangement in which the vent tube extends through the wall of the cylindrical cage, with the inner end of the tube terminating adjacent to the peripheral surface of the screw shaft. A notch in the end of the vent tube is intended to prevent the material being worked from moving up the vent tube. U.S. Pat. No. 3,781,132, issued Dec. 25, 1973, to Latinen, discloses a devolatilizer having a vent which includes wedge shaped members at the vent opening which prevent the polymer from moving into the vent.

A different approach is taken in U.S. Pat. No. 3,212,133, issued Oct. 19, 1965, to Heidrich. The Heidrich patent discloses an extruder having a vent duct which includes a screw conveyor for returning material to the cylindrical cage of the extruder, should such material be forced into the vent duct. The screw conveyor is supported in the vent duct by a bearing arrangement which permits it to be displaced axially. A limit switch detects when the screw conveyor is moved axially away from the extruder by material entering the vent duct from the cylindrical cage. The limit switch actuates a drive motor which rotates the screw conveyor, thereby returning the material to the cylindrical cage of the extruder.

While the Heidrich vent arrangement provides a positive mechanism for cleaning the vent in an extruder, actuation is dependent upon the displacement of the screw conveyor away from the extruder and such displacement occurs only when a substantial bulk of extruder material is displaced upwardly into the vent. Heidrich provides no solution to the problem of fines being entrained in escaping gases since such fines will not be of a bulk sufficient to displace the screw conveyor and cause it to be rotated. Additionally, the helical channel defined by the vent and the screw conveyor flights is relatively small in cross-sectional area. A high vapor velocity of the escaping vapor will result and accentuate the problem of fine entrainment.

In U.S. Pat. No. 3,963,558, issued June 15, 1976, to Skidmore, and in U.S. Pat. No. 3,799,234, issued Mar. 26, 1974, to Skidmore, are disclosed screw vent arrangements in which the vents each have positioned therein two interlocking screws which continuously clean the vent. The cross-sectional area for the escape of the vented gases is purposefully made small in order to act as a mechanical filter. Such an arrangement, however, results in an extremely high velocity for the vapor escaping from the devolatilizing apparatus, with the result that significant fines may be entrained in the gas.

It is seen, therefore, that a need exists for a self-cleaning venting arrangement for a devolatilizer in which the problem of fine entrainment is minimized.

SUMMARY OF THE INVENTION

A vent for a devolatilizer, including a cylindrical cage having an inlet and an outlet for material to be devolatilized, a rotatable shaft carrying a plurality of screw members in the cage arranged to carry the material through the cage, and means for rotating the shaft, includes means defining a vent opening in the cage. A vent duct means communicates with the vent opening and defines a cylindrical vent chamber into which vapor may escape. A vent screw means is positioned in the vent chamber and includes a screw body and a helical screw flight portion extending around the screw body. The screw body is of minimal diameter and pitch of the screw flight portion is sufficiently large that the velocity of the vapor leaving the cylindrical cage through the vent opening is maintained below a predetermined maximum vapor velocity. A motor means is connected to the screw body for rotating the vent screw means in the vent chamber. A vapor return means communicates with the vent chamber and extracts vapor from the chamber.

The vapor return means may include a vapor return opening in the vent duct which communicates with the vent chamber. The vapor return opening is positioned remote from the vent opening in the cage. A vapor return duct means extends substantially perpendicular to the axis of rotation of vent screw means and communicates with the vapor return opening.

The vent screw means may be configured such that the pitch of the screw flight portion remains substantially constant along the entire extent of the screw body. Alternatively, the pitch of the screw flight portion may be arranged to be substantially less adjacent the vapor return opening than the pitch of the screw flight adjacent the vent opening from the cylindrical cage. The vapor velocity of the escaping gases in the area of reduced pitch will exceed the predetermined maximum vapor of velocity.

Accordingly, it is an object of the present invention to provide a vent arrangement for a devolatilizing device in which the vent is continuously cleaned; to provide such a vent arrangement in which the vapor velocity of gases leaving the devolatilizer is maintained below a predetermined maximum vapor velocity; to provide such a vent arrangement including a vapor recovery means; and to provide such a vent arrangement in which the velocity of the vapor is increased as the vapor moves away from the devolatilizer.

Other objects and advantages of the present invention will become apparent from the following description, the accompanying drawings and the appended claims.

BRIEF DESCRIPTION OF THE DRAWINGS

FIG. 1 is a sectional view of the vent and the devolatilizer of the present invention looking along the cylindrical cage of the devolatilizer in the direction of material movement;

FIG. 2 is a sectional view of the vent and the devolatilizer of the present invention, taken generally along lines 2—2 in FIG. 1; and FIG. 3 is a partial sectional view of an alternative embodiment of the present invention, taken in a manner similar to FIG. 2.

DETAILED DESCRIPTION OF THE PREFERRED EMBODIMENT

FIGS. 1 and 2 show a portion of a devolatilizer and vent of the present invention. The devolatilizer includes a cylindrical cage 10 having an inlet 12 and an outlet 14 for the material to be devolatilized. A rotatable shaft 16 carrying screw members 18 in the cage 10 is arranged to convey the material through the cage. A motor drive means (not shown) is provided for rotating the shaft 16. Breaker bars 19 extend into the cage 10 and cooperate with the screw members 18 in moving the material through the devolatilizer. The breaker bars 19 prevent the material being worked from clinging to the shaft 16 and screw members 18.

The vent of the present invention includes means defining a vent opening 20 in the cage 10. A vent duct means 22 communicates with the vent opening 20 and defines a cylindrical vent chamber 24 into which vapor may escape from the cylindrical cage 10.

A vent screw means in the vent chamber 24 includes a screw body 26 and a helical screw flight portion 28. The screw body 26 is of minimal diameter and the pitch of the screw flight portion 28 sufficiently large that the velocity of vapor leaving the cage 10 through the vent opening 20 is maintained below a predetermined maximum vapor velocity. The vapor velocity is maintained below this maximum level in order to minimize the amount of fine material which is entrained in the escaping gas. It has been found that a vapor velocity of less than 20 feet per second is sufficiently low such that significant fine entrainment will not occur.

The vent screw is continuously rotated by a motor means which includes an electric motor 30 connected to the screw body 26 by a gear reducer 32. The screw body 26 extends through a plate 34 with a lip seal 36 providing the desired sealing. A bearing mount 38 provides support for bearing 40, which may be a tapered roller bearing. Coupling 42 connects the screw body 26 to the shaft 44 of the gear reducer 28. A coupling 46 also provides the necessary interconnection between the electric motor 30 and the gear reducer 32.

The vent screw means is rotated continuously by the motor means and provides for continuous cleaning of the vent chamber 24. The helical screw flight portion of the screw means scrapes fines from the walls of the vent chamber 24, should fines be deposited on the walls. Additionally, should substantial material be backed into the chamber 24 from the cage 10, the vent screw means will force such material back into the cage 10.

A vapor return means communicating with the sealed vent chamber 24 is provided for extracting vapor from the chamber. The vapor return means comprises a vapor return opening 48 in the vent duct means communicating with the vent chamber 24. The vapor return opening 48 is positioned remote from the vent opening 20 in the cage 10. A vapor return duct means 50 extends substantially perpendicular to the axis of rotation of the vent screw means and communicates with the vapor return opening 48. The gases escaping through the vent may be disposed of or condensed into a liquid solvent which then may be reused in processing the material. In the latter case, the vapor return duct 50 will, therefore, generally be connected to some type of a vapor condensation of filtering system for the necessary treatment.

The vent of the present invention was designed to prevent excessive fine entrainment. This objective is accomplished by maintaining the vapor velocity of gas escaping from the cage 10 sufficiently low such that excessive material is not carried away in the gas. Low vapor velocity is obtained by using a screw in the vent which defines an escape path for the vapor of a sufficiently large cross-sectional area. The vent chamber 24, in one vent arrangement embodying the present invention, had a diameter of 14 inches. It was found that if the distance between the screw flights 28 was set at 14 inches and the diameter of the screw body 26 was 2.357 inches, the gas velocity in the channel was defined by the screw flight portion 28 and the walls of chamber 24 was approximately 17 feet per second. This was determined on the basis of 12,000 pounds per hour of dry material being worked and the moisture content being reduced from 10% to 1% by the desolventizer. The outside diameter of the screw body 26 was chosen as the minimum diameter possible to provide sufficient mechanical strength.

The 14 inch channel in the vent screw was chosen, as discussed previously, to maintain the velocity of the vapor escaping from the cage 10 at a level below 20 feet per second. If a lower through rate of material being worked in the desolventizer were used or if less moisture were removed from the material, it is clear that a reduced pitch for the screw flights 28 could be chosen, while maintaining the vapor velocity below the rate of 20 feet per second.

A breaker bar 52 is provided in the vent chamber 24 for cooperation with the vent screw to increase the effectiveness of the screw in forcing material into the cage 10. It may occur, from time to time, that material may not be removed from the outlet 14 of the cylindricl cage 10 as rapidly as it is supplied to the inlet 12. In such a situation, the worked material may tend to back up into the vent chamber 24. The breaker bar 52 is provided to prevent such material from clinging to the screw flight portion 28 or the screw body 26.

Reference is now made to FIG. 3 in which an alternative embodiment of the present invention is disclosed. FIG. 3 illustrates the upper portion of the vent duct 22 incorporating a modified form of vent screw means. The balance of the vent structure is identical to that shown in FIGS. 1 and 2. The lower portion of the vent screw means of FIG. 3 is substantially the same as shown in FIG. 2. The pitch of the helical screw flight 56 above the breaker bar 52 is substantially less than the pitch of the portion of the screw flight which is closer to the vent opening. The pitch of the screw flight 28 is sufficiently large such that the vapor velocity of the escaping gases in this portion of the chamber 24 remains below the predetermined vapor velocity level. The upper section 56 of the screw flight is reduced in pitch so as to reduce the cross-sectional area of the channel through which the escaping gas is spiraled. The gas velocity will therefore increase in the upper level of the chamber 24 such that it will exceed the predetermined minimum level. This is done, so that should any fines be entrained in the escaping gas, the fines so entrained will be quickly carried out of the cylindrical vent chamber 24 and will, therefore, not be deposited on the walls of the chamber 24 or the screw flights 56.

The devolatilizing vent of the present invention is useful in removing all types of volatile materials which are removable from a material being worked, including water vapor and various hydrocarbon gases, such as shown in U.S. Pat. Nos. 3,799,235, issued Mar. 26, 1974 and 3,683,511, issued Aug. 15, 1972, both assigned to The Firestone Tire & Rubber Company.

While the forms of apparatus herein described constitute preferred embodiments of the invention, it is to be understood that this invention is not limited to these precise forms of apparatus, and that changes may be made therein without departing from the scope of the invention.

What is claimed is:

1. A vent for a devolatilizer which includes a cylindrical cage having an inlet and outlet for a material to be devolatilized, a rotatable shaft carrying a plurality of screw members in said cage arranged to convey the material through said cage, and means for rotating said shaft, comprising:

means defining a vent opening in said cage, vent duct means, communicating with said vent opening, for defining a cylindrical vent chamber into which vapor may escape, vent screw means in said vent chamber, including a screw body and helical screw flight portion extending around said screw body, said screw body being of minimal diameter and the pitch of said screw flight portion being sufficiently large such that the velocity of vapor leaving said gate through said vent opening is maintained below a predetermined maximum vapor velocity, motor means connected to said screw body, for rotating said vent screw means in said vent chamber, and vapor return means, communicating with said vent chamber, for extracting vapor from said chamber.

2. The vent of claim 1 in which said screw body extends through an opening in said vent duct means and said motor means comprises an electric motor connected to said screw body by a gear reducer.

3. The vent of claim 1 in which said vapor return means comprises a vapor return opening in said vent duct means communicating with said vent chamber, said vapor return opening positioned remote from said vent opening in said cage, and vapor return duct means extending substantially perpendicular to the axis of rotation of said vent screw means and communicating with said vapor return opening.

4. The vent of claim 3 in which the pitch of said screw flight portion remains substantially constant along the entire extent of said screw body.

5. The vent of claim 3 in which the pitch of said screw flight portion is substantially less adjacent said vapor return opening than adjacent said vent opening, such that the vapor velocity in the area of reduced screw flight pitch exceeds said predetermined minimum vapor velocity.

6. The vent of claim 1 further comprising breaker bar means, attached to said vent duct means in said chamber, for cooperating with said vent screw means to prevent adherence to said vent screw means of any material entering said chamber from said cylindrical cage.

* * * * *